United States Patent
Christenbury et al.

(10) Patent No.: US 9,555,591 B2
(45) Date of Patent: Jan. 31, 2017

(54) TIRE TREAD WITH APERTURES AND A METHOD FOR THE MANUFACTURE OF A TIRE TREAD WITH APERTURES

(75) Inventors: Damon Lee Christenbury, Fountain Inn, SC (US); Daniel Rey, Greer, SC (US)

(73) Assignees: Compagnie Generale des Establissements Michelin, Clermont-Ferrand (FR); Michelin Recherche et Technique S.A., Granges-Paccot (CH)

(*) Notice: Subject to any disclaimer, the term of this patent is extended or adjusted under 35 U.S.C. 154(b) by 778 days.

(21) Appl. No.: 13/882,080

(22) PCT Filed: Mar. 23, 2011

(86) PCT No.: PCT/US2011/029580
§ 371 (c)(1),
(2), (4) Date: Apr. 26, 2013

(87) PCT Pub. No.: WO2012/057847
PCT Pub. Date: May 3, 2012

(65) Prior Publication Data
US 2013/0213539 A1    Aug. 22, 2013

(51) Int. Cl.
*B29D 30/56* (2006.01)
*B60C 11/00* (2006.01)
(Continued)

(52) U.S. Cl.
CPC ........... *B29D 30/0681* (2013.01); *B29D 30/52* (2013.01); *B29D 30/56* (2013.01); *B29D 30/68* (2013.01);
(Continued)

(58) Field of Classification Search
CPC ................. B60C 11/0323; B60C 11/02; B29D 2030/685; B29D 30/68; B29D 30/56; B29D 30/52
See application file for complete search history.

(56) References Cited

U.S. PATENT DOCUMENTS 1,876,016 A * 9/1932 Pederson ................ B60C 11/00
152/209.1
2,907,365 A * 10/1959 MacDonald ........ B60C 11/0309
152/209.6
(Continued)

FOREIGN PATENT DOCUMENTS

DE         946956 A *  8/1956
DE      19642283 A1    4/1998
(Continued)

OTHER PUBLICATIONS

Machine translation for France 742,981 (no date).*
(Continued)

*Primary Examiner* — Steven D Maki
(74) *Attorney, Agent, or Firm* — Dority & Manning, P.A.

(57) ABSTRACT

A tire tread with certain features and a method for manufacturing such a tire tread are provided. More particularly, a tire tread is provided that has layers of apertures where some layers remain covered until after a certain amount of tread wear has occurred. Such apertures can comprise, for example, sipes, grooves, or other apertured features in the tread. A method of making such tire tread is also provided.

19 Claims, 6 Drawing Sheets

(51) Int. Cl.
  *B60C 11/02* (2006.01)
  *B29D 30/06* (2006.01)
  *B29D 30/52* (2006.01)
  *B60C 11/03* (2006.01)
  *B29D 30/68* (2006.01)

(52) U.S. Cl.
  CPC .......... *B29D 2030/685* (2013.01); *B60C 11/00* (2013.01); *B60C 11/02* (2013.01); *B60C 11/03* (2013.01); *B60C 11/0323* (2013.04)

(56) References Cited

U.S. PATENT DOCUMENTS

| | | |
|---|---|---|
| 3,814,160 A | 6/1974 | Creasey |
| 4,024,895 A | 5/1977 | Barron |
| 4,040,464 A | 8/1977 | Skidmore |
| 4,073,330 A | 2/1978 | Allard |
| 4,226,274 A | 10/1980 | Awaya et al. |
| 4,564,737 A | 1/1986 | Burke et al. |
| 5,221,382 A | 6/1993 | Sid-Ahmed |
| 5,303,756 A | 4/1994 | Hill |
| 5,478,426 A | 12/1995 | Wiler et al. |
| 6,220,199 B1 | 4/2001 | Williams |
| 6,481,480 B1 | 11/2002 | Schuster et al. |
| 6,951,235 B2 | 10/2005 | Kawashima et al. |
| 7,013,939 B2 | 3/2006 | Rhyne et al. |
| 7,766,061 B2 | 8/2010 | Mayni |
| 2003/0213545 A1 | 11/2003 | Majumdar |
| 2004/0231779 A1 | 11/2004 | Girard et al. |
| 2006/0005912 A1 | 1/2006 | Weydert et al. |
| 2007/0144641 A1 | 6/2007 | Nguyen |
| 2007/0152362 A1 | 7/2007 | Greenwell et al. |
| 2008/0023116 A1 | 1/2008 | Mayni et al. |
| 2010/0116439 A1 | 5/2010 | Lundell |
| 2012/0145334 A1* | 6/2012 | Pallot ................. B26D 3/003 157/13 |
| 2013/0213543 A1* | 8/2013 | Christenbury ...... B60C 11/0041 152/209.18 |

FOREIGN PATENT DOCUMENTS

| | | |
|---|---|---|
| DE | 19822323 | 12/1999 |
| DE | 20319521 U1 | 5/2005 |
| EP | 0073313 B1 | 12/1986 |
| EP | 0714724 A2 | 6/1996 |
| EP | 0768518 B1 | 7/2003 |
| FR | 742981 | 3/1933 |
| FR | 742981 A * | 3/1933 |
| GB | 1257017 | 12/1971 |
| JP | 62-030904 | 2/1987 |
| JP | 62-286805 | 12/1987 |
| JP | 02-034406 A * | 2/1990 |
| JP | 02-246809 | 2/1990 |
| JP | 3-153406 A | 7/1991 |
| JP | 3-153406 A | 7/1991 |
| JP | 2001-187516 | 12/1999 |
| JP | 2005-193853 | 9/2004 |
| JP | 2007-168438 | 12/2006 |
| JP | 2010-052453 A * | 3/2010 |
| KR | 10-2008-0081560 | 9/2008 |
| KR | 10-2009-0095370 | 9/2009 |
| WO | WO 2004/096583 A1 | 11/2004 |
| WO | WO-2010/053478 A1 * | 5/2010 |
| WO | WO 2010/059162 | 5/2010 |
| WO | WO-2010/102975 A1 * | 9/2010 |
| WO | WO 2012/057847 | 5/2012 |

OTHER PUBLICATIONS

Machine translation for Japan 2010-052453 (no date).*
International Search Report for International Application No. PCT/US2010/54227, dated Dec. 20, 2010.
International Search Report for International Application No. PCT/US2011/029580, dated May 20, 2011.
Citation of Patent Applications Form.

* cited by examiner

TIRE TREAD WITH APERTURES AND A METHOD FOR THE MANUFACTURE OF A TIRE TREAD WITH APERTURES

FIELD OF THE INVENTION

The present invention relates to a tire tread with certain features and to a method for manufacturing such a tire tread. More particularly, the present invention relates to a tire tread having layers of apertures where some layers remain covered until after a certain amount of tread wear has occurred.

BACKGROUND OF THE INVENTION

The tread of a tire is commonly provided with various features that can improve performance as well as impact the aesthetics of the tread. For example, a tread may include blocks of tread and/or ribs. The tread may be configured with apertures of various types including grooves along the lateral and circumferential directions, holes, sipes, and/or other features of various sizes and shapes. These features can improve tread wear, handling, braking, consumer appeal and other characteristics of the tire as well.

In addition to tire aesthetics, tread features can be used to improve traction such as e.g., wet and snow traction. For example, apertures of various sizes and orientations may be added to the ribs and/or blocks of a tire in varying configurations to improve the ability of the tire to grip the road surface—particularly in deleterious conditions such as rain or snow. However, apertures and other tread features can have disadvantages such as increased rolling resistance, particularly as the tire tread becomes less rigid through the addition of such features.

In a conventional approach, apertures and other tread features are added to the tire during the curing process. More specifically, first an uncured tire (i.e. a green tire) is created on a tire forming drum in a layered process where sheets of material are added in steps along with other components such as e.g., the bead cores, belts, and/or other components. A tread band is provided for a tread region. The materials are sequentially applied to a forming drum that initially provides a flat surface but ultimately moves the beads together to form the toroidal tire shape.

The resulting green tire is then placed into a curing press where heat and pressure are used to cure the tire rubber components as well as bond the rubber components together. During this curing step, the walls of the press can be equipped with intricate molding elements that impart tread features into the uncured tread of the green tire. For example, fin-like metal projections may be added to the walls of the tire press in the tread forming section in order to impart apertures such as grooves and other details to the tread as the tread is cured by pressure and heat.

The conventional manufacture of a tire with various features along the tread presents certain challenges. The nature of the molding process limits the shape and configuration of grooves and other apertures that can be added to the tire tread to apertures that can be formed by the insertion of metal projections extending from the walls of the curing press. For example, the conventional tire press can create apertures that extend from the outer surface of the tread inward, but cannot create apertures in the tire tread that appear only after a period of tread wear has occurred, i.e. hidden or covered apertures. Similarly, apertures can be created that extend radially outward from the innermost portion of the tread but conventional methods cannot create an aperture that is hidden from the bottom and top portion of the tread—i.e. conventional methods cannot create an aperture that does not extend from either the radially innermost or radially outermost surface of the tread. In addition, the manufacture of relatively thin and deep apertures using standard molding techniques is fraught with difficulties due to the fragility of mold elements needed to make such features.

Accordingly, a tire tread having apertures and a method of making such a tread would be useful. More particularly, a method that can be used to construct a tire having apertures of a certain depth that are available for enhancing traction at each of the various levels of tread wear would be particularly beneficial. Such a method that can also be used to create apertures of varying geometries, densities, and depths while still allowing for control of the rigidity of the tire tread so as to improve performance such as e.g., rolling resistance would also be useful.

SUMMARY OF THE INVENTION

Aspects and advantages of the invention will be set forth in part in the following description, or may be obvious from the description, or may be learned through practice of the invention.

In one exemplary aspect, the present invention provides a method of manufacturing a tread portion of a tire. The method can include the steps of providing a first layer of uncured tire rubber; creating apertures in the first layer of uncured tire rubber; curing portions of the first layer of uncured tire rubber that are adjacent to the apertures of the first layer without curing all of the first layer of uncured tire rubber; placing a second layer of uncured tire rubber onto the first layer; and, bonding the second layer to the first layer without significantly cross-linking the second layer to the first layer at locations within the apertures of the first layer.

The method can further include creating apertures in the second layer of uncured tire rubber; curing portions of the second layer of uncured tire rubber that are adjacent to the apertures of the second layer without curing all of the second layer of uncured tire rubber; placing a third layer of uncured tire rubber onto the second layer; and, bonding the second layer to the first layer without significantly cross-linking the third layer to the second layer at locations within the apertures of the second layer.

The apertures of the second layer can be offset relative to the apertures of the first layer. Similarly, the apertures of the third layer can be offset relative to the apertures of the second layer, such that the apertures of the first, second, and third layers are not aligned along the radial direction.

Rubber from the second layer can be positioned into the apertures of the first layer. Such positioning can, for example, be provided by inserts molded into the second layer or can occur from the flow of rubber from the second layer during the curing process.

The method can further include the step of placing the first, second, and third layers onto a tire forming drum. Additionally, the method can include curing the first, second, and third layers.

The method described above can be repeated with multiple layers until a tread portion having the predetermined thickness along the radial direction is provided.

A tire can be manufactured using the tread portion. During use of the tire, rubber from the apertures of the first and second layers can be ejected. As such, the apertures of the first and second layer remain hidden from view until a certain amount of tread wear has occurred.

The size of the portions of uncured tire rubber adjacent to the apertures that are cured during the step of curing can be at least the minimum amount needed to prevent the aperture from being eliminated by bonding in the aperture during a step of curing the remainder of the first and second layers of uncured tire rubber. The steps of creating apertures and curing portions can be executed concurrently. The shape of the apertures can be selected from the group comprising circular, square, and triangular.

The method can further includes the steps of providing a roller having projections configured in the desired shape of the apertures of the first layer, heating the roller; and, moving the roller across a surface of the first layer so as to create the apertures in the first layer.

In another exemplary embodiment, the present invention provides a tread portion for a tire. The tire defines a radial direction. The tread portion includes a plurality of layers of rubber material that have been cured together to form the tread portion. Each layer in turn includes a plurality of apertures oriented radially outward. The apertures of each layer are positioned in an offsetting manner along the radial direction relative to apertures of an adjacent layer. The apertures of the radially-inward layers contain rubber from an adjacent, and radially-outward layer that is not permanently bonded to the walls of such apertures of the radially-inward layer. During operation of a tire having the tread portion, rubber contained in the apertures of the radially-inward layers can be ejected by centrifugal forces once exposed by wear of the tread.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

The present invention relates to a tire tread with certain features and to a method for manufacturing such a tire tread. More particularly, the present invention relates to a tire tread having layers of apertures where some layers remain covered until after a certain amount of tread wear has occurred. Such apertures can comprise, for example, sipes, grooves, or other apertured features in the tread. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
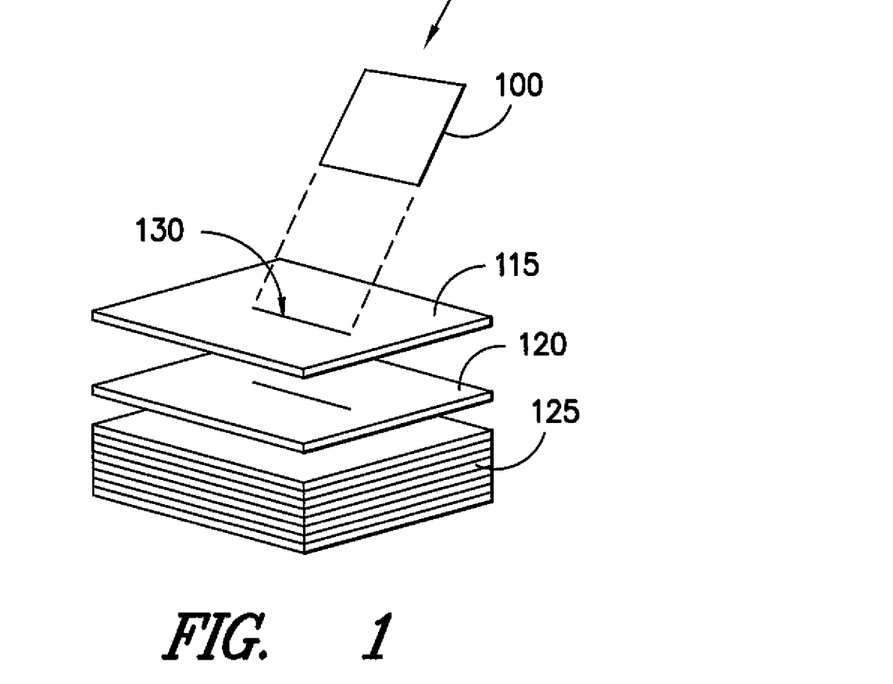
FIG. 1 provides an illustration of an exemplary method of the present invention, in which incisions are made in successive layers of material used for constructing the tread portion of a tire.

FIG. 1 provides an illustration that will be used in describing an exemplary method of the present invention. Layer 115 is a sheet of tire rubber that will be used to construct a tread portion of a tire. As used herein, "uncured" or "green" means that the tire rubber has not been vulcanized, a known process in which pressure and heat are applied to cause polymer chains in the rubber to cross-link. "Tire rubber" as used herein is not limited to just natural rubber and refers instead to numerous formulations of rubber, other polymers, carbon black, and other materials that may be used for forming and creating the elements of a tire such as the tread portion. "Tread portion" as used herein refers to a portion of tire rubber positioned on the outer circumference of the tire and intended for contact with the ground as the tire rolls across. A tread portion can have varying thicknesses and widths depending upon, e.g., the vehicle and use intended for the tire. As used herein, a sipe is a groove in the tread that is less than 2 mm in width. Finally, as used herein, an aperture is a groove, sipe, hole or other recess defined by the tread and configured to affect the performance of the tire including e.g., traction.

Additional layers 120 and 125 of tire rubber appear below layer 115. These layers are sequentially placed onto one another (i.e. stacked) in order to create a tread portion of the desired thickness. For example, layers 115, 120, and 125 might be placed on a tire forming drum or on a tire intermediate such as a belt or carcass that has been placed on a tire forming drum. Alternatively, instead of being placed onto a tire forming drum, layers 115, 120, 125 might be placed onto a building surface used to create only a tread belt. As will be understood by one of skill in the art, a tread belt can be placed e.g., onto a buffed tire in order to retread a tire. Only a portion of layers 115, 120, and 125 are shown in FIG. 1, it being understood by one of skill in the art that such layers would e.g., extend a certain length and width as required for extending around the circumference of a tire to provide for ground contact. The number of such layers 115, 120, and 125 that are used will help determine the thickness of the tread portion.

As shown for layers 115 and 120, such layers include a cut or incision 130. As used herein, incision 130 is simply a small groove or channel that is made in a layer of tire rubber. Although shown as a straight line, incisions 130 can be applied in various other predetermined shapes as needed in order to create the sipe that is desired. For example, various curves, angles, and other features may be added to the shape of incisions 130.

In order to create incision 130, a heated knife or blade 100 is inserted as shown in FIG. 1 for layer 115. Blade 100 is e.g., a relatively thin, metal element that cuts through layer 115 by pressing against and through layer 115 as shown by the arrow. The shape of blade 100 determines the shape of the resulting incision 130.

Importantly, before application of blade 100, layers 115, 120, and 125 are uncured tire rubber. Blade 100 is heated to a temperature such that during cutting of e.g., layer 115 by pressing into contact with blade 100, sufficient heat is transferred to layer 115 to cure a portion of layer 115 that is adjacent to incision 130. The amount of heat provided by blade 100 does not cure all of layer 115. Rather, only a portion of layer 115 that is adjacent to incision 130 is cured by the heat from blade 100. More specifically, and by way of example, the minimum portion of layer 115 that should be cured is only so much as will prevent incision 130 from being eliminated during a subsequent curing step (further discussed below) that is used to bond layers 115, 120, and 125 together and/or to the other elements of a tire. More than this minimum amount may be cured, provided layers 115, 120, and 125 can still be bonded together during the subsequent curing step. For example, in one exemplary embodiment, blade 100 is heated to a temperature in the range of about 180 to 260 degrees Celsius.

It should be understood that blade 100 is provided by way of example. Blades 100 of various other shapes may also be used. In addition, as will be understood by one of skill in the art using the teachings disclosed herein, other tools or techniques may be used to create incision 130 and cure a portion of the layer of otherwise uncured tire rubber adjacent to incision 130. For example, curing could be done chemically after the cutting step or the area near the incision could be cauterized after creating the incision using a heating element. Other techniques may be used as well as will be understood by one of ordinary skill in the art using the teachings disclosed herein.

By repeating the process of placing layers of uncured tire rubber onto each other and creating incisions by cutting one or more of the layers while curing a portion of the layer as described, a sipe can be constructed from the stacking of incisions 130 in the various layers of uncured tire rubber. Importantly, by varying the shape of incisions 130 and the relative placement of incisions 130 in the sequentially added layers 115, 120, and 125, multiple sipes of complex geometries and varying depths can be created.

Figure 2:
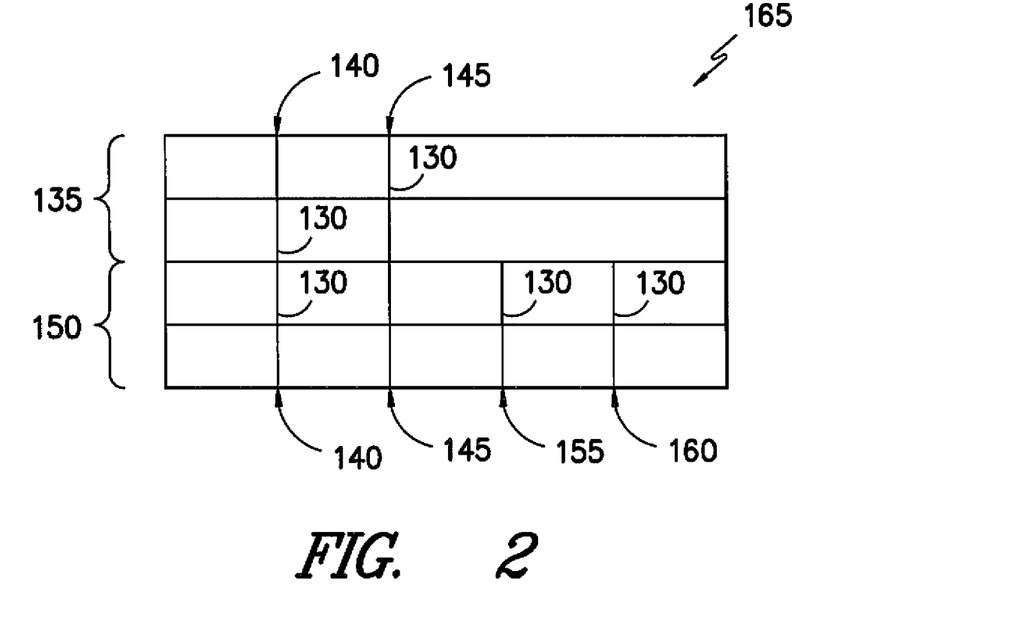
FIG. 2 provides an illustration of an exemplary embodiment of a tread according to the present invention as viewed along a toroidal cross-section of a portion of a tread.

For example, referring now to FIG. 2, an exemplary embodiment of a portion of a tread as viewed along a toroidal cross-section is provided. The tread portion 165 includes layers 135 and 150 provided with incisions 130 as previously described. Layers 135 are towards the outer part of the tread portion 165 while layers 150 are towards the inner part of tread portion 165, it being understood that "inner" and "outer" are with reference to the radial position such layers would have when tread portion 165 is in place on a tire.

Incisions 130 in the various layers 135 and 150 form sipes 140, 145, 155, and 160. More specifically, sipes 140 and 145 are formed by adjoining and/or stacking the incisions 130 among the layers 135 and 150. Similarly, sipes 155 and 160 are formed by adjoining the incisions 130 in layers 150. Because incisions 130 were cut while also curing the tire rubber adjacent thereto in layers 135 and 150, incisions 130 will not be eliminated when tread portion 165 is subsequently cured. Such curing step might include placement in a tire press in order to cure and join layers 135 and 150 to each other and/or to a tire intermediate. Alternatively, layers 135 and 150 might be cured in order to create a tread band for placement on a buffed tire as part of a retreading operation as will be understood by one of skill in the art.

Still referring to FIG. 2, it should be noted that sipes 155 and 160 are contained only with inner layers 150 and not outer layers 135. Accordingly, in the early life of a tire having tread portion 165, only sipes 140 and 145 are visible and in operation to provide improved traction in the use of the tire. As the tire is used and tread wear occurs, layers 135 are slowly removed to eventually reveal sipes 155 and 160. These sipes 155 and 160 thereby provide improved traction while, at the same time, the rigidity of the tread portion 165 is controlled as a function of tread depth in order to minimize an unwanted effect on rolling resistance. Thus, the present invention allows for greater control over the number, positioning, density, and profile of the sipes as a function of tread depth in the design and construction of a tire. In addition, incisions 130 can be constructed with a near zero thickness, so that energy loss from rolling resistance can be further minimized.

Figure 3:
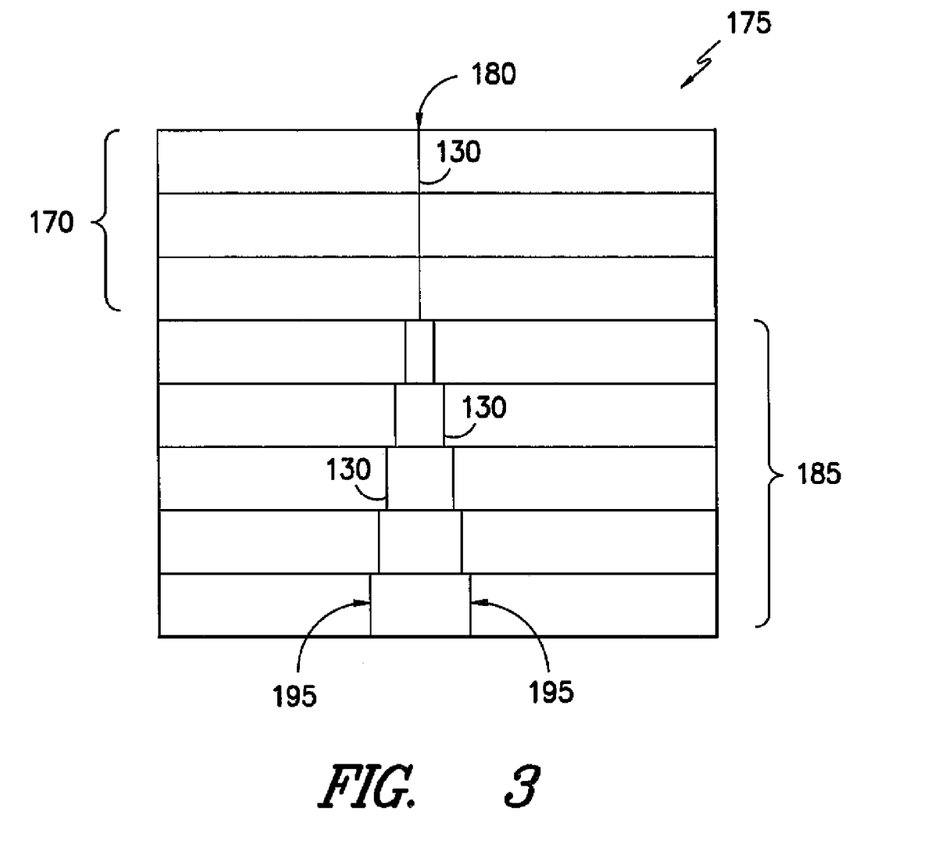
FIG. 3 provides another illustration of an exemplary embodiment of a tread according to the present invention as viewed along a toroidal cross-section of a portion of a tread.

FIG. 3 provides another exemplary embodiment of a tread portion 175 as viewed along a toroidal cross-section. Tread portion 175 is created from outer layers 170 and inner layers 185. Notably, tread portion 175 is thicker than tread portion 165 as shown in FIG. 2. Other thicknesses may be used as desired depending upon the intended application.

Tread portion 175 is constructed as previously described from uncured tire rubber layers 170 and 185 that have been sequentially placed, or layered, onto one another. Incisions 130 have cut into layers 170 and 185 while curing a portion of such layers to prevent elimination of incisions 130 in subsequent curing. Tread portion 175 includes sipe 180 and a pair of sipes 195. As seen in FIG. 3, sipes 180 and 195 create a non-linear or Y-shaped profile (unlike FIG. 2, which presented linear sipes 140, 145, 155, and 160). Such effect is realized by changing the relative positions along the layers of incisions 130 as tread portion 175 is constructed through the addition of successive layers 170 and 185.

As a tire bearing tread portion 175 is used, initially only sipe 180 will be visible and operating to effect e.g., wet and snow traction. However, as tread portion 175 wears and removes layers 170, the pair of sipes 195 will become exposed and operable for improving traction performance. In addition, the separation between the pair of sipes 195 will increase with wear as layers 185 are removed during use from tread portion 175.

The embodiments provided in FIGS. 2 and 3 are by way of example only. Using the teachings disclosed herein, it will be understood that other variations in e.g., the depth, shape, number, and density of the sipes may be created with the present invention.

Figure 4:
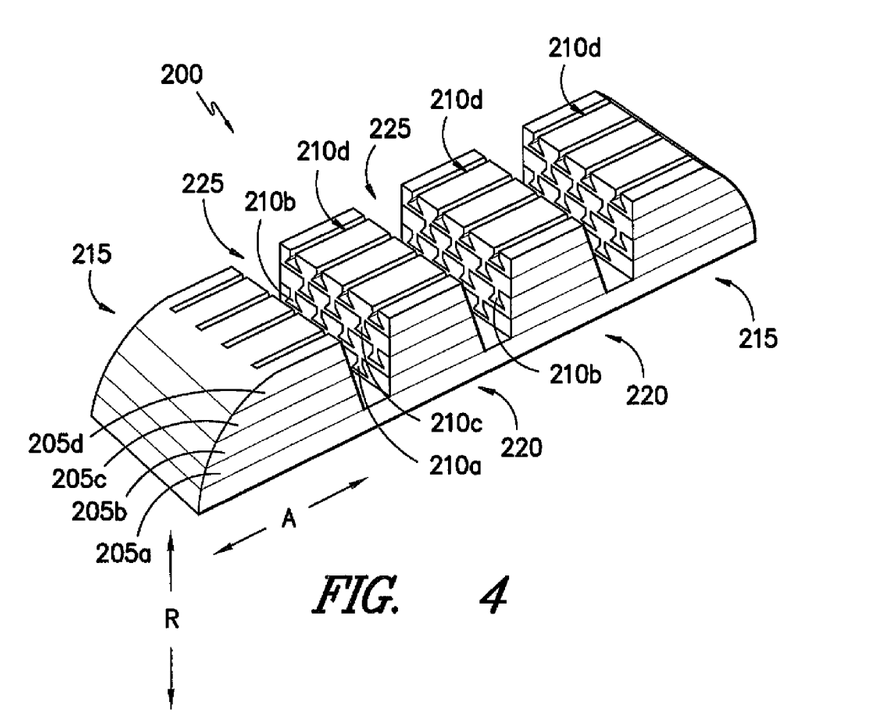
FIG. 4 provides a cross-section of another exemplary embodiment of a tread portion according to the present invention.

FIG. 4 provides a cross-section of another exemplary embodiment of a tread portion 200 of the present invention. Tread portion 200 is constructed from a plurality of layers 205 of tread rubber that have been placed over each other. Although lines are shown for purposes of demarcating the layers 205, curing of the tread portion 200 may cause such lines to be less visible than depicted in FIG. 4. Tread portion 200 includes shoulder ribs 215 and interior ribs 220, which are separated by grooves 225. Only a portion of the tread is shown—it being understood that such tread would continue circumferentially around the tire.

Layers 205 include apertures 210 that extend along the axial direction A of tread portion 200. The apertures 210d in outer layer 205d are open or clear, while the apertures 210a, 210b, and 210c in the inner layers 210a, 210b, and 210c each contain rubber that is provided from an adjacent, radially-outward layer as will be further described. Because apertures 210d in outer layer 205d are open, such operate to enhance traction for a tire that includes tread portion 200. However, the radial depth of aperture 210d is contained within layer 205d and only extends through a portion of the radial depth of layer 205d. Accordingly, ribs 215 and 220 are provided with greater rigidity as compared to a rib having an aperture that extends e.g., the entire radial depth of ribs 215 and 220. This increased rigidity is expected to provide improved traction and improved rolling resistance for a tire using tread portion 200. In addition, after outer layer 205d is worn through as the tire is used, apertures 210c in layer 205c will be exposed to enhance traction once rubber within apertures 210c is ejected. Similarly, as the tread portion 200 continues to wear, apertures 210b and then 210a will be sequentially exposed. In this way, apertures 210 among the various layers 210a, 210b, 210c, and 210d continuously provide for enhancing traction as the tread wears while the rigidity of ribs 215 and 220 is also maintained.

Figure 5:
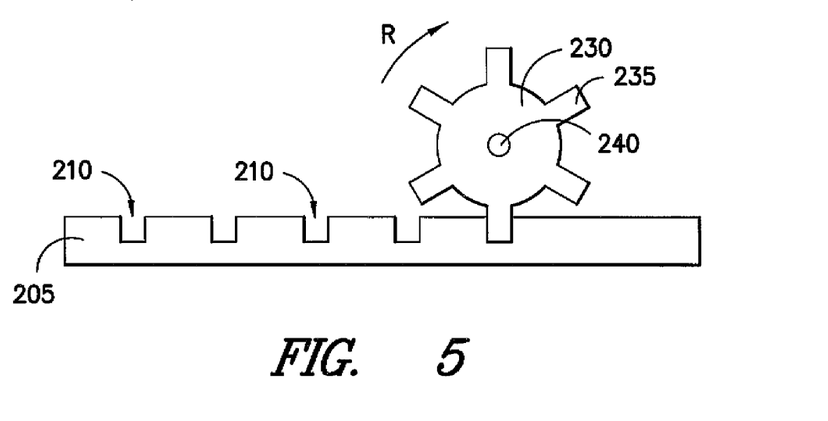
FIG. 5 illustrates an exemplary method that can be used to create apertures in a layer of tread.

FIG. 5 illustrates an exemplary method that can be used to create apertures in a layer of uncured tread rubber 205. Roller 230 is provided with multiple projections 235 and is rotatable (arrow R) about axis 240. The layer of tread rubber 205 is fed into the path of roller 230, which in turn presses into layer 205 to create multiple apertures 210. This process can be repeated for multiple layers 205 in order to create tread portion 200. The spacing of projections 235 about roller 230 controls the distance between apertures 210 in layer 205. Such can be adjusted depending upon the density of apertures 210 intended for tread portion 200. Other configurations are possible as well including e.g., adjusting the angle of projections 235 relative to axis 240 so as to create apertures 210 that are not necessarily parallel to axial direction A of tread portion 200. Different shapes may also be used for projection 235 so as to create apertures 210 of different shapes.

Figure 6:
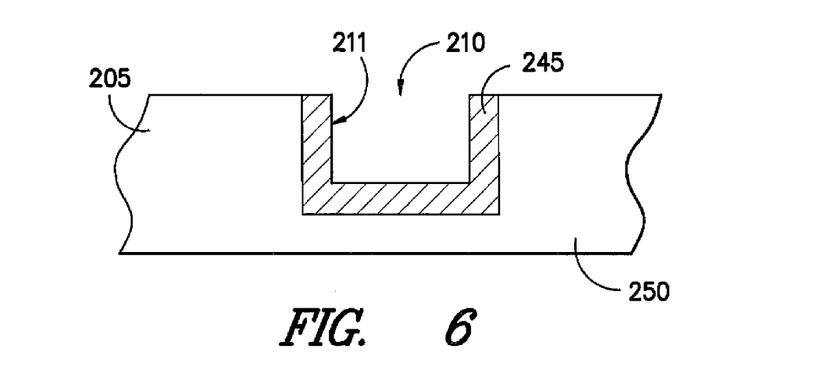
FIG. 6 provides a cross-section of an exemplary embodiment of an aperture and depicts the partial curing of a portion of the tread adjacent to the aperture.

In one exemplary aspect of the present invention, roller 230 is heated to a temperature sufficient to cure a portion of uncured tire rubber layer 205. More specifically, and referring now to FIG. 6, by heating roller 230 to a sufficient temperature, a portion 245 of layer 205 is cured. Portion 245 is adjacent to aperture 210 as shown in FIG. 6. By curing portion 245, the walls 211 of aperture 210 are precluded from significantly bonding or cross-linking with an adjacent layer of tire rubber. The heating of roller 230 is provided by way of example only. Other methods may be used to obtain a partial cure of layer 205 only at portion 245. By way of example, chemical treatment may be used to cure only portion 245.

Figure 7:
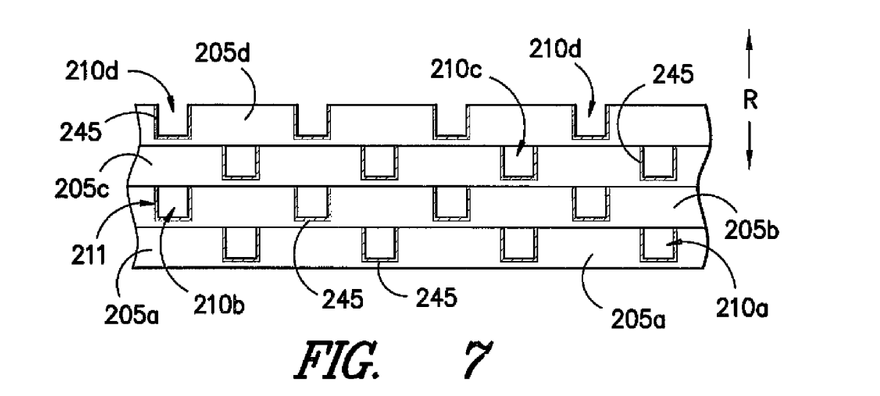
FIG. 7 provides a cross-sectional view, before curing of the remainder of the tread, of an exemplary embodiment of a tread portion of the invention constructed from multiple layers of rubber.

Once multiple layers 205 with apertures 210 and portions 245 have been formed, layers 205 are placed onto each other as shown in FIG. 7. As shown, apertures 210 of any particular layer 205 are offset relative to an adjacent layer so that apertures of different layers do not align along radial direction R. For example, apertures 210a of first layer 205a are not aligned along the radial direction R with apertures 210b of second layer 205b, apertures 210b of second layer 205b are not aligned along the radial direction R with apertures 210c of third layer 205c, and so forth.

Figure 8:
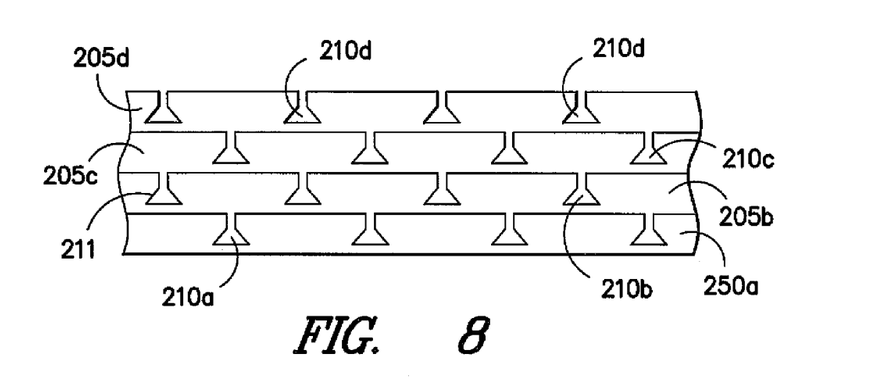
FIG. 8 illustrates the cross-section of FIG. 7 after curing the tread portion and depicts a possible shape for the apertures after such curing.

After properly positioning layers 205a, 205b, 205c, and 205d, all are cured by the application of e.g., heat to crosslink and thereby bond such layers together to form tread portion 200. FIG. 8 illustrates another cross-sectional view of layers 205a, 205b, 205c, and 205d after such curing. Due to the curing process, rubber has flowed into apertures 210a, 210b, and 210c in radially-inward layers 205a, 205b, and 205c, respectively. For example, rubber from layer 205b has filled apertures 210a in layer 205a. However, apertures 210d in the radially outermost layer 205d remain open. FIG. 8 shows that the shape of apertures 210 may change during curing; the cross-sectional view of apertures 210 in FIG. 8 is provided by way of example only as other shapes may be possible as well.

Continuing with FIG. 8, while curing has crosslinked and, therefore, bonded together layers 205, such bonding is non-existent or insignificant within apertures 210a, 210b, and 210c. Specifically, any bonding to the walls 211 of apertures 210a, 210b, and 210c is not sufficient to overcome the centrifugal forces that occur during operation of a tire equipped with tread portion 200. As a result, during operation of such a tire, as e.g., layer 205d is worn away to reveal layer 205c, any rubber contained in apertures 210c is ejected by centrifugal forces as the tire rotates during use. This process continues as outer layers 205 are worn away such that each layer 205 eventually presents apertures 210 for enhancing traction. Until a covering layer 205 is worn away, layers located radially inward remain "hidden" or covered from view along the radial direction. For example, layer 205d covers apertures 210c in layer 205c until layer 205d is worn away. Similarly, apertures 210a are hidden by layer 205b until layer 205b is worn away.

Figure 9:
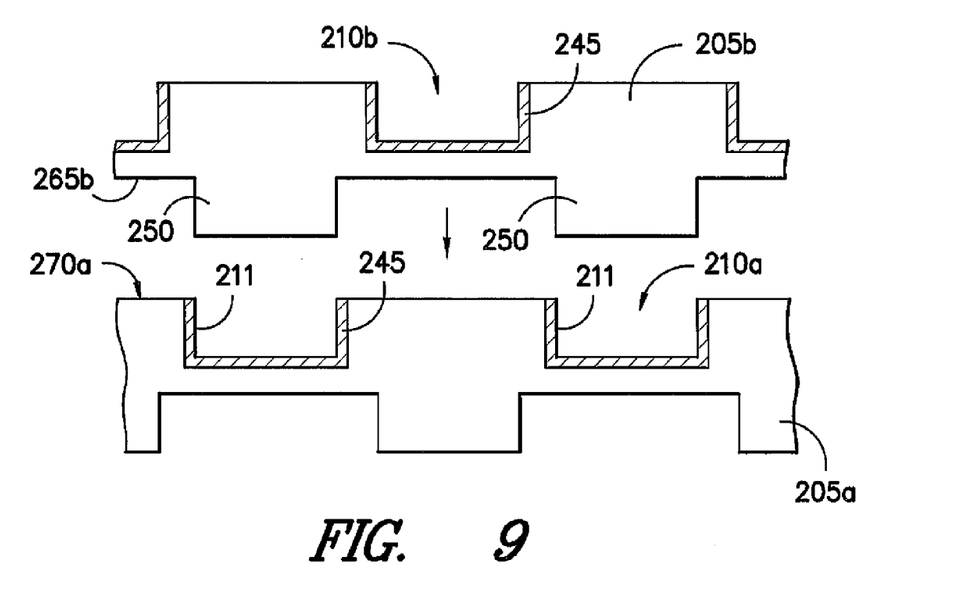
FIG. 9 provides a cross-sectional view, before curing, of another exemplary embodiment of a tread portion of the invention constructed from multiple layers of rubber.
Figure 10:
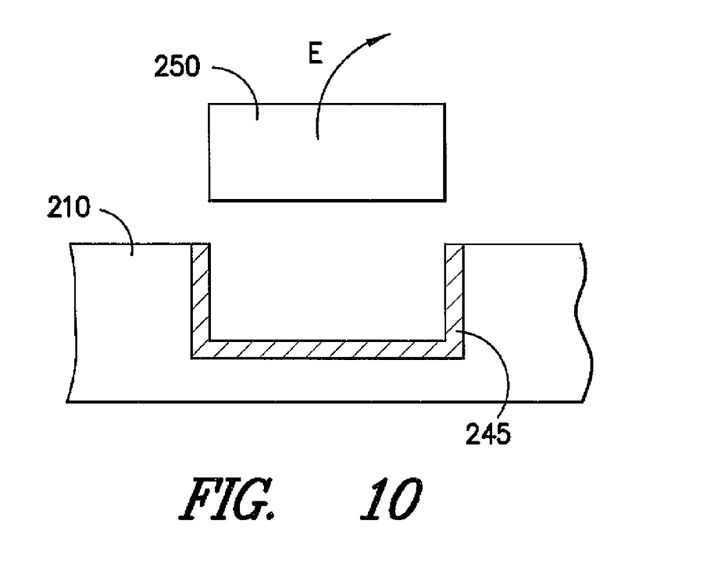
FIG. 10 illustrates the ejection of rubber from an aperture during operation of a tire.

Still another exemplary method of creating a tread portion of the present invention is illustrated in FIG. 9. Using this method, a tread portion is created using multiple layers such as 205a and 205b that are placed onto each other. However, for this embodiment, second layer 205b contains multiple projections 250 on radially-inward face 265b that are received into the apertures 210a on the radially-outward face 270a of first layer 205a. As with the previously described embodiment of FIGS. 7 and 8, apertures 210 have an adjacent portion of tread rubber 245 that is cured before projections 250 are inserted. As such, once layers 205a and 205b are joined and then cured, the bonding between projections 250 and the walls 211 of apertures 210a is insufficient to overcome centrifugal forces that occur during tire operation. Accordingly, during operation of a tire, as second layer 205b is worn down to reveal aperture 210a, projection 250 is ejected by centrifugal forces as shown by arrow E in FIG. 10. Aperture 210a is now open and available to improve traction. However, as previously described, because apertures 210a and 210b have a limited depth that does not extend through all layers, the rigidity of a tread portion equipped with apertures 210a and 210b is maintained.

Figure 11:
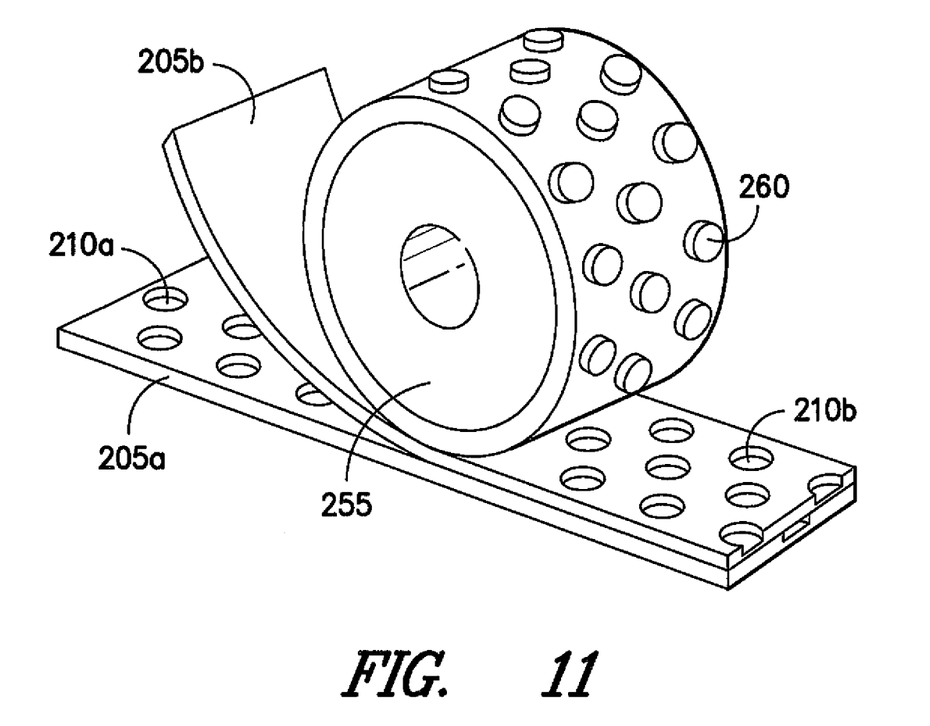
FIG. 11 illustrates another exemplary method that can be used to create apertures in a layer of tread.

Apertures 210 are not limited to the rectangular shape shown in FIGS. 4 through 10. A variety of other shapes for apertures 210 may also be used including e.g., square, triangular, circular, and others as well. FIG. 11 provides another exemplary method in which circular apertures 210 are provided. As shown, roller 255 is provided with circular projections 260. As roller 255 is moved across a layer 205 of uncured rubber, apertures 210 are created. Multiple layers 205*a* and 205*b* are shown. As with previously provided examples, the apertures 210*b* of layer 205*b* are offset relative to apertures 210*a* of layer 205*a*. FIG. 11 is provided only by way of example; other methods for creating apertures 210 of different shapes in layers 205 may be used as well.

More particularly, while the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method of manufacturing a tread portion of a tire, the tire defining a radial direction, the steps comprising:
    providing a first layer of uncured tire rubber;
    creating apertures in the first layer of uncured tire rubber;
    curing portions of the first layer of uncured tire rubber that are adjacent to the apertures of the first layer without curing all of the first layer of uncured tire rubber;
    placing a second layer of uncured tire rubber onto, and radially-outward of, the first layer;
    positioning rubber from the second layer into the apertures of the first layer after said step of curing portions of the first layer, wherein said positioning fills the apertures of the first layer with rubber from the second layer; and
    bonding the second layer to the first layer without significantly cross-linking the second layer to the first layer at locations within the apertures of the first layer.

2. A method of manufacturing a tread portion of a tire as in claim 1, further comprising the step of:
    creating apertures in the second layer of uncured tire rubber;
    curing portions of the second layer of uncured tire rubber that are adjacent to the apertures of the second layer without curing all of the second layer of uncured tire rubber;
    placing a third layer of uncured tire rubber onto, and radially-outward of, the second layer;
    positioning rubber from the third layer into the apertures of the second layer after said step of curing portions of the second layer; and
    bonding the third layer to the second layer without significantly cross-linking the third layer to the second layer at locations within the apertures of the second layer.

3. A method of manufacturing a tread portion of a tire as in claim 2, the tire defining a radial direction, further comprising the steps of offsetting the apertures of the second layer relative to the apertures of the first layer; and, offsetting the apertures of the third layer relative to the apertures of the second layer, whereby the apertures of the first, second, and third layers are not aligned along the radial direction.

4. A method of manufacturing a tread portion of a tire as in claim 2, further comprising the steps of:
    manufacturing the tire using the tread portion; and,
    ejecting rubber from the apertures of the first and second layers during operation of the tire.

5. A method of manufacturing a tread portion of a tire as in claim 1, further comprising the step of placing the first, second, and third layers onto a tire forming drum.

6. A method of manufacturing a tread portion of a tire as in claim 5, further comprising the step of curing the first, second, and third layers.

7. A method of manufacturing a tread portion of a tire as in claim 1,
    repeating said steps of providing, creating, curing, placing, and bonding using one or more additional layers of uncured tire rubber until the tread portion having a predetermined thickness is formed.

8. A method of manufacturing a tread portion of a tire as in claim 1, wherein said step of positioning rubber from the second layer into the apertures of the first layer further comprises applying heat to the second layer to allow the rubber from the second layer to flow into the apertures of the first layer.

9. A method of manufacturing a tread portion of a tire as in claim 1, wherein the second layer of uncured tire rubber comprises projections configured for receipt by the apertures of the first layer, and wherein said step of positioning rubber from the second layer into the apertures of the first layer comprises inserting projections from the second layer into the apertures of the first layer.

10. A method of manufacturing a tread portion of a tire as in claim 1, wherein the tread portion from said bonding step is affixed to a buffed tire so as to retread the tire.

11. A method of manufacturing a tread portion of a tire as in claim 1, wherein the apertures of the first layer are hidden from view until a certain amount of tread wear has occurred.

12. A method of manufacturing a tread portion of a tire as in claim 1, wherein the size of the portions of uncured tire rubber adjacent to the apertures that are cured during said step of curing is at least the minimum amount needed to prevent the aperture from being eliminated during a step of curing the remainder of the first and second layers of uncured tire rubber.

13. A method of manufacturing a tread portion of a tire as in claim 1, wherein said steps of creating apertures and curing portions are executed concurrently.

14. A method of manufacturing a tread portion of a tire as in claim 1, wherein the apertures each have a shape selected from the group comprising circular, square, and triangular.

15. A method of manufacturing a tread portion of a tire as in claim 1, further comprising the steps of:
    providing a roller having projections configured in the desired shape of the apertures of the first layer;
    heating the roller; and,
    moving the roller across a surface of the first layer so as to create the apertures in the first layer.

16. A tread portion constructed according to the method of claim 1.

17. A tread portion for a tire, the tire defining a radial direction, the tread portion comprising:
    a plurality of adjacent layers of rubber material that have been cured together to form the tread portion, the plurality of layers comprising at least one radially-inward layer and at least one radially-outward layer, wherein each said layer comprises:
        a plurality of apertures oriented radially outward, the apertures of each layer positioned in an offsetting manner along the radial direction relative to apertures of an adjacent layer, the apertures of the at least one radially-inward layer filled with rubber from the at least one radially-outward layer that is not permanently bonded to the walls of the apertures of the radially-inward layer;

whereby during operation of a tire having the tread portion, rubber contained in the apertures of the at least one radially-inward layer can be ejected by centrifugal forces once exposed by wear of the tread.

18. A tread portion for a tire as in claim 17, wherein the apertures of a radially inward layer are covered by a radially-outward layer of rubber material such that the apertures of the radially-inward layer are hidden until after sufficient tread wear has occurred through use of the tire to expose the apertures of the radially-inward layer.

19. A tread portion for a tire as in claim 17, where each of said plurality of layers of rubber material comprises:
   a radially-inward face that includes a plurality of projections extending from the radially-inward face; and
   a radially-outward face that includes the plurality of apertures.

* * * * *